United States Patent Office 3,409,401
Patented Nov. 5, 1968

3,409,401
METHOD OF PRODUCING PHOSPHORUS TRIBROMIDE
Herbert Jenkner, Cologne-Deutz, and Otto Rabe, Cologne-Hohenberg, Germany, assignors to Chemische Fabrik Kalk G.m.b.H., Cologne-Kalk, Germany
No Drawing. Filed Dec. 16, 1966, Ser. No. 602,175
Claims priority, application Germany, Jan. 19, 1966, C 37,954
5 Claims. (Cl. 23—205)

ABSTRACT OF THE DISCLOSURE

Method of producing phosphorus tribromide by reaction of bromine and white phosphorus in phosphorus tribromide as diluent and, if desired, distillation of the crude phosphorus tribromide wherein the reaction is carried out at a temperature over 100° C., preferably, at 120 to 130° C., the quantity of bromine supplied to the reaction mixture being 0.05 to 0.5% in excess of that theoretically required for the reaction.

---

It is well-known that bromide and white phosphorus react, with a markedly exothermic heat effect, to form phosphorus tribromide which is liquid at ordinary temperature. According to Ullmann's Encyklopadie der technischen Chemie (Encyclopedia of Industrial Chemistry), III Edition (1962), vol. 13, p. 565, this reaction should be carried out in the presence of diluents in order to moderate the violence of the reaction. Carbon disulphide, benzene and phosphorus tribromide itself have proved successful as diluents. An additional mitigation of the reaction can be achieved by maintaining low reaction temperatures. In large-scale industrial production of phosphorus tribromide from bromine and white phosphorus, therefore, temperatures of 30 to 70° C. are employed and up to 25% excess phosphorus is used in order to avoid the formation of phosphorus pentabromide. The formation of phosphorus pentabromide is particularly undesirable because this is readily deposited as a solid compound in colder parts of the apparatus and adversely affects its functioning. On the other hand, however, the use of an excess of phosphorus entails the disadvantage that the phosphorus tribromide produced always contains free phosphorus. This phosphorus content cannot be fully eliminated by distillation of the phosphorus tribromide. The distillate always contains a small quantity of finely divided white phosphorus which has the effect of discolouring the product yellow. Furthermore, increased precautionary measures have to be adopted in the processing of such a product, because finely divided phosphorus is readily inflammable.

Possibilities were therefore sought of eliminating the deficiencies entailed in the known methods and of producing a pure phosphorus tribromide containing no phosphorus pentabromide and no free phosphorus.

A method was found of producing phosphorus tribromide by the reaction of bromine and white phosphorus in phosphorus tribromide as the diluent, at elevated temperatures and possibly with distillation of the crude phosphorus tribromide. According to this method, the reaction is carried out at a temperature of over 100° C. and preferably of 120 to 130° C., an excess of bromine amounting to 0.05 to 0.5% above the theoretically necessary quantity of bromine being maintained in the reaction mixture.

According to the invention, the phosphorus tribromide is produced either in that the bromine is added to a mixture of phosphorus tribromide and phosphorus or in that bromine and phosphorus are introduced into the reaction mixture simultaneously but separately from each other.

In order to carry out the method according to the invention, employing the first-mentioned preferably discontinuous mode of operation, phosphorus tribromide is placed in a reaction vessel from which the air has been expelled by an inert gas, for example nitrogen or carbon dioxide, and the phosphorus is introduced. The weight proportion of phosphorus tribromide to phosphorus should be approx. 2.5 to 3.5. The mixture obtained is pre-heated to a temperature of approx. 60° C. While the mixture is being briskly stirred, liquid bromine is slowly added at such a rate that the temperature of the reaction mixture rises to over 100° C. and, during the progress of the reaction, is kept preferably at 120 to 130° C. The rate at which the bromide is added depends therefore essentially upon the measures used to dispel the heat liberated during the reaction. The bromine should be added in a quantity which is 0.05 to 0.5% above the quantity which is theoretically necessary to form phosphorus tribromide from the quantity of phosphorus used. When all the bromide has been added, it is advantageous to extract the newly-produced quantity of phosphorus tribromide while the remaining quantity of phosphorus tribromide is again used as a diluent in the production of further phosphorus tribromide from phosphorus and bromine.

According to the other modus operandi according to the invention, bromine and phosphorus are introduced into the reaction mixture at the same time but separately from each other. To this end, the phosphorus tribromide which is used as the diluent is pre-heated to a temperature of approx. 60° C. in a reaction vessel from which the air has been expelled by an inert gas such as for example nitrogen or carbon dioxide. The quantity of phosphorus tribromide present in the reaction vessel should be approx. 2.5 to 3.5 times the quantity by weight of phosphorus which is to be reacted. The phosphorus and the bromide are added to the reaction mixture, which is being briskly stirred, at the same time but at locations which are as remote from each other as possible, and at such a speed that the temperature of the reaction mixture rises to above 100° C. and is kept preferably at 120 to 130° C. during the course of the reaction. The rate at which the reaction components are introduced into the reaction mixture depends therefore essentially upon the measures adopted to dispel the heat liberated during the reaction. Furthermore, the bromine must be introduced into the reaction mixture in such a way that, throughout the entire reaction 0.05 to 0.5% more bromine is present in the reaction mixture than is required to form phosphorus tribromide from the phosphorus present in the reaction mixture.

Where this modus operandi according to the invention is used for batch-wise production, a quantity of phosphorus tribromide corresponding to the reaction component used is extracted from the reaction vessel, the remaining phosphorus tribromide being left in the reaction vessel as the diluent for a fresh batch. In the case of the equally possible continuous implementation, the reaction product is drawn continuously from the reaction mixture according to the rate at which the reaction components are introduced into the mixture.

The phosphorus tribromide produced according to the invention has a slightly reddish colour and can be used for most industrial fields of application without first being purified. From this industrial product, it is possible to produce a purified and colourless phosphorus tribromide by distillation, preferably at diminished pressure. It is advantageous to add approx. 0.5 to 5% by weight of red phosphorus to the crude phosphorus tribromide for this purpose.

By applying a relatively high reaction temperature, the formation of phosphorus pentabromide is avoided, when producing phosphorus tribromide by the method of the invention, so that the use of excess phosphorus becomes unnecessary. Thus, not only is a saving on phosphorus achieved, but a phosphorus-free end product is obtained. Hitherto, the use of temperatures above 100° C. was regarded as too dangerous in the production of phosphorus tribromide from white phosphorus and bromine. By the slow addition of bromine to a mixture of phosphorus tribromide and phosphorus or the separate introduction of phosphorus and bromide into phosphorus tribromide as a diluent, the reaction can however be kept perfectly under control even in the case of large-scale industrial batches, so that the use of temperatures of 120 to 130° C. does not involve any danger. It has therefore become possible, by using the method according to the invention, to circumvent the difficulties which hitherto arose in the production of phosphorus tribromide and to obtain a high yield of pure phosphorus tribromide.

The method according to the invention is explained in greater detail hereinafter with reference to an example which does not represent any limitation of the method according to the invention.

Example 600 kg. phosphorus tribromide are placed in a 1000-litre capacity enamelled container fitted with an agitator and heated to 60° C. once the air has been expelled by nitrogen. 1,552 kg. bromine and 200 kg. phosphorus are then introduced into the reaction vessel within a period of 2 hours, at locations which are remote from each other. The reaction mixture is agitated and kept at temperatures of 120 to 130° C. by cooling. When all the phosphorus has been added, a further 2 kg. bromine are added, whereupon the weakly yellowish colour of the reaction mixture changes to a slightly reddish tone. From this phosphorus tribromide, sufficient is drawn off that once again 600 kg. remain in the reaction vessel for a fresh batch. The phosphorus tribromide obtained is, with the addition of 2 kg. red phosphorus, distilled at reduced pressure. The yield of colourless phosphorus tribromide amounts to 1,660 kg., in other words 95% of the theoretical quantity.

We claim:

1. In a method of producing phosphorus tribromide by reacting bromine and white phosphorus in phosphorus tribromide as diluent, the steps of carrying out said reaction at a temperature of over 100° C. and supplying a quantity of bromine to the reaction mixture 0.05 to 0.5% in excess of that required for reaction with the phosphorus to form phosphorus tribromide.

2. A method according to claim 1 in which the bromine is added to a mixture of phosphorus tribromide and phosphorus.

3. A method according to claim 1 in which bromine and phosphorus are introduced into the reaction mixture simultaneously but at separate places.

4. A method according to claim 1 in which the reaction is carried out at 120 to 130° C.

5. A method according to claim 1, comprising in addition, adding 0.05 to 5% by weight of red phosphorus to the phosphorus tribromide produced and distilling off the phosphorus tribromide at a reduced pressure.

References Cited

UNITED STATES PATENTS 3,119,666   1/1964   Nametz _____ 23—205

OTHER REFERENCES

Mellor, J. W.: A Comprehensive Treatise on Inorganic and Theoretical Chemistry, vol. VIII, Longmans, Green & Co., N.Y., 1928.

OSCAR R. VERTIZ, *Primary Examiner.*

G. O. PETERS, *Assistant Examiner.*